Nov. 26, 1963    F. BIERWIRTH    3,111,809
ADJUSTING MECHANISM FOR GAS TURBINE FUEL CONTROL
Filed Nov. 7, 1960    4 Sheets-Sheet 2

INVENTOR
FRIEDHELM BIERWIRTH

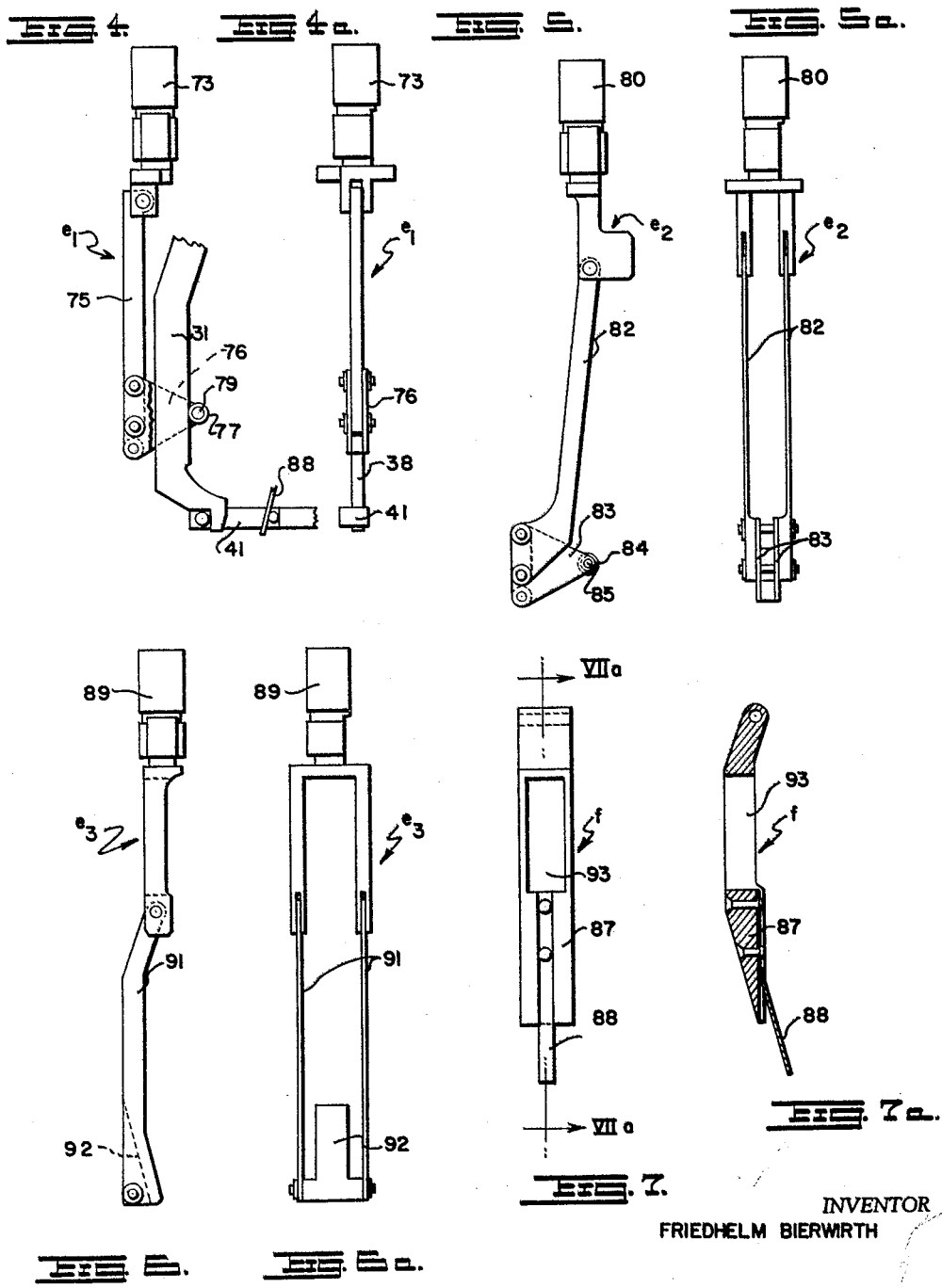

Nov. 26, 1963    F. BIERWIRTH    3,111,809
ADJUSTING MECHANISM FOR GAS TURBINE FUEL CONTROL
Filed Nov. 7, 1960    4 Sheets-Sheet 4

INVENTOR
FRIEDHELM BIERWIRTH

BY *Dicke, Craig and Freudenberg*
ATTORNEYS

United States Patent Office 3,111,809
Patented Nov. 26, 1963

3,111,809
ADJUSTING MECHANISM FOR GAS TURBINE FUEL CONTROL
Friedhelm Bierwirth, Stuttgart-Bad Cannstatt, Germany, assignor to Daimler-Benz Aktiengesellschaft, Stuttgart-Unterturkheim, Germany
Filed Nov. 7, 1960, Ser. No. 67,741
Claims priority, application Germany Nov. 7, 1959
12 Claims. (Cl. 60—39.28)

The present invention relates to an adjusting mechanism, especially for an installation controlling the fuel quantity supplied to gas turbine drive units, and more particularly relates to a fuel control system for controlling the fuel quantities supplied to gas turbine drive units in which certain boundary conditions within which the automatic fuel adjustment is to be maintained are adapted to be adjusted independently of one another.

A fuel control system embodying the the basic concept also underlying the present invention is described in the copending application Ser. No. 23,330, filed on April 19, 1960, now Patent No. 3,064,421, issued Nov. 20, 1962, in the name of Wilhelm Jurisch, entitled "Fuel Control System," and assigned to the assignee of the instant application. The fuel control system of this copending application, the subject matter of which is incorporated herein by reference insofar as necessary, relates to an installation for controlling the fuel quantities supplied to gas turbine drive units whereby a hydraulically actuated fuel control member which meters the fuel quantity supplied under pressure to the burner system, and a servo-mechanism operating in dependence on a compressor magnitude, especially the compressor end pressure, are provided which are both arranged preferably parallel to each other and are operatively connected with each other by an adjusting member which serves as abutment as well as for purposes of actuation of a limiting installation which together with the aforementioned servo-mechanism influence the adjustment of the fuel metering member in such a sense that the maximum permissive fuel quantity for the drive unit as well as the lowest fuel quantity cannot be transgressed, respectively, over the entire control range. It is also proposed in this aforementioned copending application to arrange the aforementioned limiting installation within the hydraulic control circulatory system ahead of the hydraulic actuating installation actuating the fuel control member. Consequently, the limiting installation effectively intervenes directly in the control circulatory system as a hydraulic installation.

Figure 2:
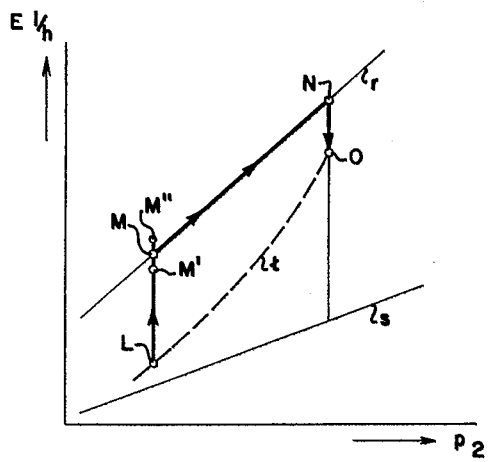
Figure 3:
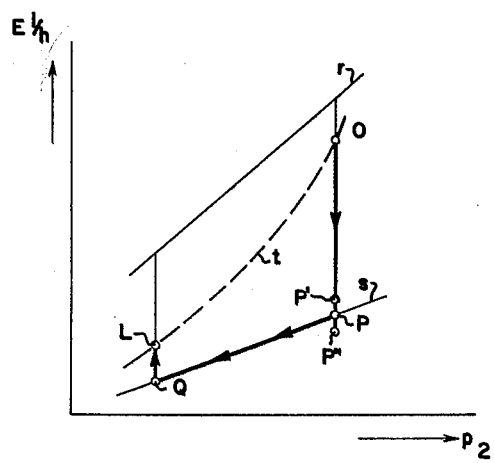

Control installations which operate in principle according to the schematic showing of the diagrams of FIGURES 2 and 3 of the drawing herein, are known per se in the prior art. In order to remain within the upper and lower boundary lines $r$ and $s$ during the acceleration and deceleration of the drive unit, respectively, adjusting mechanisms are known in the prior art which are actuated, on the one hand, in dependence on the compressor end pressure $p_2$ and, on the other, form abutments for a member actuating or driving the fuel metering piston which abutments change progressively in the mutual distance thereof. The distances of the two end abutments thereby increase during the operation with an increasing pressure $p_2$ at a fixed ratio to each other. The prevailing positions of both end abutments correspond thereby to the lines $r$ and $s$ in FIGURES 2 and 3 which consist of an infinite number of individual operating points. In this prior art adjusting mechanism, only one abutment, namely the one that determines the point P in its height along the lower line $s$ can be changed, and additionally only the slope of the lower line $s$ may be varied by increasing or decreasing the effective leverage of the last-mentioned abutment.

The present invention essentially consists in an arrangement in which additionally with the aid of the adjusting mechanism described hereinabove, the reversal points M and P which are located along the upper and lower boundry lines $r$ and $s$ for the fuel quantities in the control diagram and which are passed through during acceleration and deceleration of the drive unit as well as the slope of the upper and lower boundary lines $r$ and $s$ are adapted to be adjusted independently of one another, i.e., all of the four aforementioned values or magnitudes are individually adjustable in accordance with the present invention.

It is additionally proposed in accordance with the present invention to coordinate the actuation for the adjusting mechanism to the control housing in such a manner that also during the operation, especially during the run-in period, an adjustment of the operating conditions and operating points in question is possible, in contradistinction to the known prior art constructions in which the one abutment member and the coupling rod actuating the same are adapted to be adjusted by themselves only in the length thereof, i.e., are, therefore, inaccessible during operation.

Accordingly, it is an object of the present invention to provide a fuel control system, especially for gas turbine drive units which eliminates and obviates the disadvantages and drawbacks encounted in the prior art constructions as pointed out hereinabove and in the aforementioned copending application and which further improves the control system disclosed in the latter.

It is another object of the present invention to provide a fuel control system and adjusting mechanism therefor, especially for gas turbine drive units which is not only simple in construction and reliable in operation but which is also easy to assemble and adjust even during operation of the drive unit.

Still a further object of the present invention resides in the provision of an adjusting mechanism controlling the fuel supply to a gas turbine drive unit in which the operating characteristics of the fuel control are readily adjustable, especially with respect to the slope of the upper and lower boundary curves of operation as well as the points of reversal disposed along the end points of these boundary curves.

Still another object of the present invention resides in the provision of an adjusting mechanism for controlling the fuel supplied to gas turbine drive units in which the adjustment of the aforementioned operating conditions may be realized independently of one another and in a readily accessible and safe manner even during operation of the unit.

Figure 1:
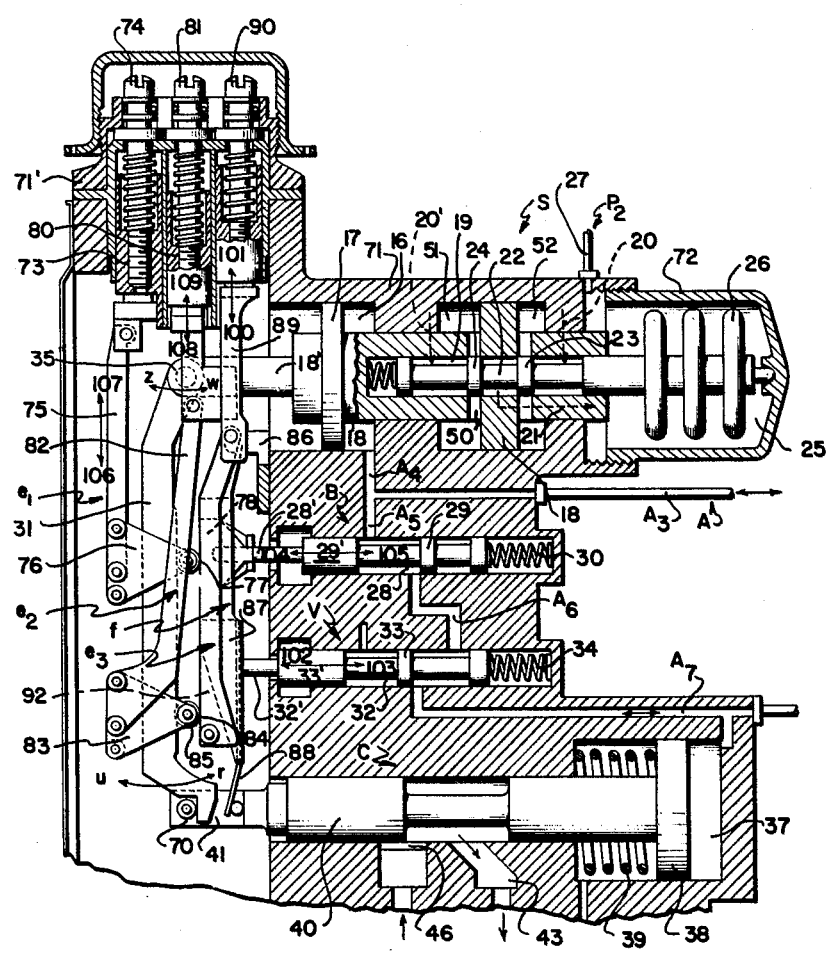
Figure 4:
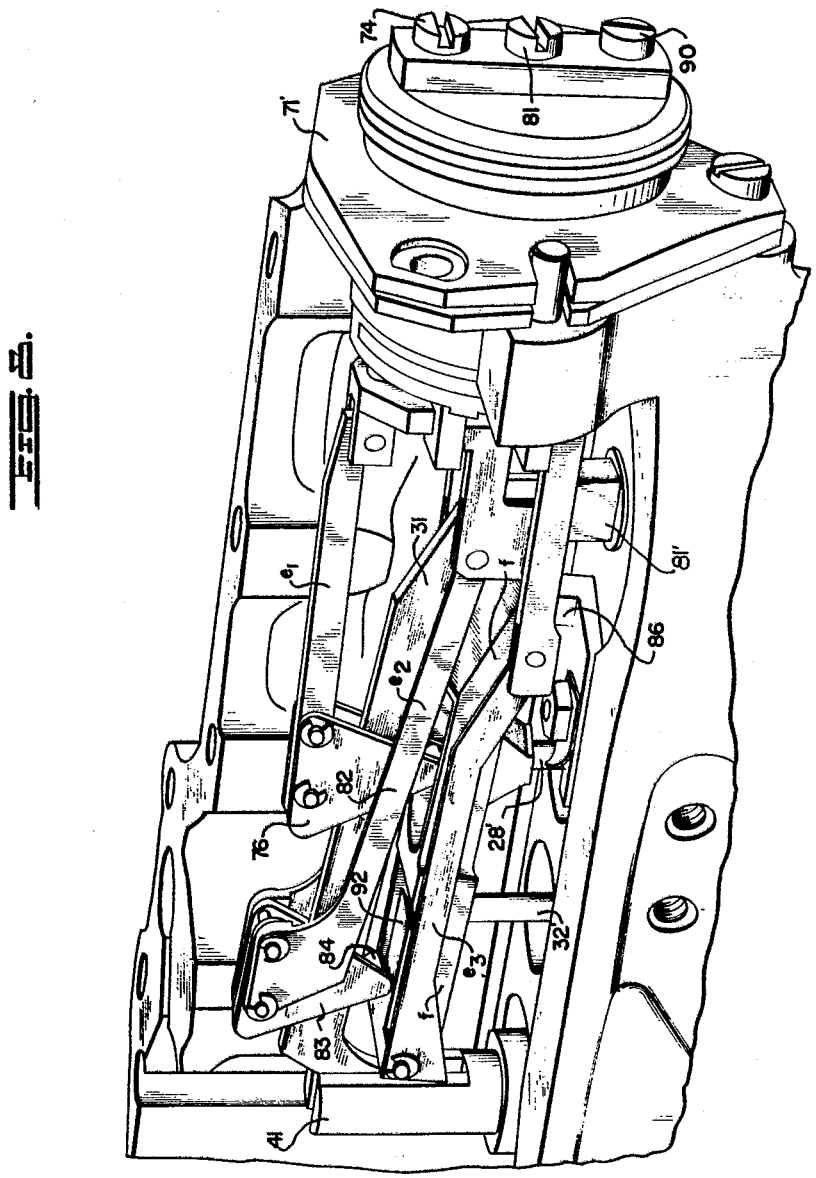

These and other objects, features and advantages of the present invention will become more obvious from the following description, when taken in connection with the accompanying drawing, which shows, for purposes of illustration only, one embodiment in accordance with the present invention, and wherein FIGURE 1 is an overall cross-sectional view through an adjusting mechanism for a control installation according to the present invention consisting of a servomotor S operating in dependence on the end pressure $P_2$ of the compressor, of an accelerating limit installation B, of a deceleration limit installation V, and of a fuel control or metering installation C, FIGURES 2 and 3 are diagrammatic views representing the operaitng curves for the control installation and adjusting mechanism according to the present invention, FIGURES 4 and 4a are front elevational and side elevational views of one adjusting member in accordance with the present invention, FIGURES 5 and 5a are front elevational and side elevational views of another adjusting member in accordance with the present invention, FIGURES 6 and 6a are front elevational and side elevational views of still another adjusting member in accordance with the present invention, FIGURE 7 is an elevational view of a drag lever in accordance with the present invention, FIGURE 7a is a cross-sectional view taken along line VIIa—VIIa of FIGURE 7, and FIGURE 8 is a perspective view of the adjusting mechanism in accordance with the present invention.

Referring now to the drawing, wherein like reference numerals are used throughout the various views to designate corresponding parts, and more particularly to FIGURE 1, reference character S designates therein a servomotor provided with a working piston 18 having an outwardly directed extension 18'. An adjusting lever 31 is pivotally secured at 35 to the extension 18', whereas the opposite end of the adjusting lever 31 is movably connected with the outwardly projecting extension 41 of the fuel metering piston 40 of the fuel metering installation generally designated by reference character C.

An adjusting sleeve or socket 72, closed against the outside thereof, is threadably received within the right-hand end of control housing 71 by means of which the pivot point 35 may be adjusted in the axial direction thereof through the follower piston assembly 18, 22, 23 and 24 of the servo-motor S. The piston assembly includes, as pointed out hereinabove, a working piston 18 and a spool-type slide member 22 provided with two control pistons 23 and 24 which are adapted to slide within a central bore 19 provided in the working piston 18. Schematically indicated pressure lines 20 and 20' discharge into bore 19 while a schematic return or discharge line 21 leads away from the bore 19, for example, to the sump. The slide member 22 is displaced by means of a pressure box or pressure cell assembly 26 accommodated within the adjusting socket 72 whereby the arrangement thereof is such that the compressor end pressure $p_2$ admitted through line 27 acts on the pressure cells 26. For that purpose, the chamber 25 formed within the socket 72 is in communication over a line 27 with the drive unit (not shown) in such a manner as to apply to chamber 25 a pressure proportional or equal to the compressor pressure $p_2$, preferably the end pressure thereof. Since the admission and discharge through lines 20, 21' and 21 takes place in any suitable conventional manner, these lines are indicated in FIGURE 1 only schematically for sake of clarity.

The line portion $A_3$ of the control line system generally designated by reference character A connects a suitable control mechanism (not shown) of conventional construction such as shown and described, for example, in the aforementioned copending application with line portions $A_4$ and $A_5$.

The line portion $A_5$ of the control line system A leads from the inlet line $A_3$ to an acceleration limit installation generally designated by reference character B which consists of a spool-type slide member 28 provided with control pistons 29 and 29', with a return spring 30 and with a pin-like abutment 28' which abuts with the outer end thereof, constructed as a hammer head 78 against the slide member 76 guided with its two shackles on the adjusting lever 31 as will be described more fully hereinafter.

The line portion $A_4$ leads to a pressure oil supply reservoir or chamber 16 the function and operation of which will be described more fully hereinafter. The chamber 16 is closed off by a displacement piston 17 which forms part of the servo-motor generally designated by reference character S which is constructed as a follow-up piston assembly. As mentioned hereinabove, the working piston of this follow-up piston assembly is designated by reference numeral 18, and additionally includes the spool-type slide member 22 provided with pistons 23 and 24 adapted to reciprocate within bore 19.

A further line section $A_6$ of the control line system A leads from the acceleration limit installation B to a deceleration limit installation V which also consists essentially of a spool-type slide member 32 provided with control pistons 33 and 33', with a return spring 34 and with a pin-like abutment member 32' which abuts against a guide portion 87 of the drag lever generally designated by reference character $f$ as will also appear more fully hereinafter.

A further line section $A_7$ of the control line system A extends between the deceleration limit installation V and the fuel metering installation C. The line section $A_7$ terminates within a chamber 37 which is closed off, on the one hand, by a working piston 38 spring-loaded by means of spring 39. The working psiton actuates a fuel metering piston 40 which in turn is extended outwardly in the form of a rod 41 or the like on which the other end of the adjustment member 31 is movably mounted in any suitable manner.

The remainder of the fuel system may be as shown and described in the aforementioned copending application, and includes a fuel supply pump producing an injection pressure and connected in any suitable manner with the metering slot 46 while the fuel supply line 43 leads from the fuel metering installation C to the injection nozzles (not shown) of the combustion chamber or chambers of the drive unit. Additionally, the fuel system may include a return line leading from the drive unit to a differential pressure control mechanism or mechanisms as disclosed in the aforementioned copending application or in another copending application, Ser. No. 23,331, filed on April 19, 1960, now abandoned, in the name of Wilhelm Jurisch, entitled "Fuel System for Gas Turbines," and also assigned to the assignee of the present application the subject matter of which is also incorporated herein by reference insofar as necessary. Additionally, the fuel system according to the present invention may also include a speed limit control device as well as maximum temperature limit mechanism, all of which are fully disclosed in the aforementioned copending applications, whereby the identity of the general layout of the hydraulic system of the present application and of those two copending applications make obvious the applicability of each and every feature of the latter such as, for example, the specific construction of the metering slot, to the present application.

Two adjusting members are guided on the adjusting lever 31, namely a first adjusting member generally designated by reference character $e_1$ (FIGURES 1, 4 and 4a) for the acceleration limit installation B and an adjusting member generally designated by reference character $e_2$ (FIGURES 1, 5 and 5a) for the deceleration limit installation V. The adjusting member $e_1$ consists of a guide piece 73 movably supported within the control housing 71 and provided with an internal thread in which is threadably engaged an externally threaded adjusting screw 74 which is rotatably supported within the lid 71' of the control housing 71 in such a manner as to be non-displaceable in the axial direction thereof. The adjusting member $e_1$ further includes a two-armed lever 75 which is pivotally connected with the guide piece 73 while a slide member 76 is rigidly connected with the front end of the lever 75 which slide member 76 is composed of two lateral shackles rigidly connected with each other by appropriate bolts. The slide member 76 is guided with the two shackles thereof on the adjusting lever 31 and abuts at the roll-off point of contact 77 thereof effectively constituted by the roller member 79 against the outer end 28' of the control piston 28 of the acceleration limit installation B which outer end 28' is constructed as a hammerhead 78. The through-bolt roller member 79 effectively providing the roll-off point 77 is maintained in engagement with the adjusting lever 31 by the force of the return spring 30 via the piston unit 28.

The foregoing description is also applicable in an analogous manner to the second adjusting member $e_2$. The forked guide piece thereof is designated by reference numeral 80 (FIGURES 1, 5 and 5a), which cooperates with the adjusting screw 81 in the manner described already hereinabove with adjusting member $e_1$. The adjusting member $e_2$ includes a lever portion 82 consisting of two shackle-type side bars rigidly connected with the slide member 83 which is guided along the adjusting lever 31 (FIGURE 1) along the roll-off point of contact 84 effectively provided by the through-bolt roller member designated by reference numeral 85.

The drag lever generally designated by reference character $f$ (FIGURES 1, 7 and 7a) is pivotally mounted on a support bracket 86 (FIGURE 1) secured in any suitable manner at the control housing 71. The drag lever $f$ is provided with an aperture 93 for the passage therethrough of the hammerhead 78 provided at the outwardly extending end 28' of the piston unit 28 of the acceleration limit installation B. The drag lever $f$ is provided with a guide portion 87 in the shape of an inclined surface on which is secured a leaf spring 88 the outer end of which abuts with pretension against the extension 41 of the control piston 40, provided for that purpose with a suitable abutment member. The outer end 32' of the piston unit 32 of the deceleration limit installation V abuts against the guide portion 87, as a result of the force exerted thereon by the return spring 34.

An additional adjusting member generally designated by reference character $e_3$ (FIGURES 1, 6 and 6a) forms part of the adjusting mechanism which encloses the drag lever $f$ on the sides thereof. The adjusting member $e_3$ consists of a forked guide piece 89 provided with an internal thread into which engages the adjusting screw 90 which again is rotatably secured within the cover portion 71' so as to be non-displaceable in the axial direction thereof. The two shackle-type side bars of an arm 91 are pivotally secured at one end thereof on the two arms rigidly secured or integrally formed with the guide piece 89, while a wedge member 92 is pivotally secured at the opposite end of each of the arms 91 which wedge member 92 slides along the guide portion 87 of the drag lever $f$ and pushes the bolt member 85 against the adjusting lever 31 over the roll-off contact point 84 of the adjusting member $e_2$.

*Operation*

The operation of the adjusting mechanism in accordance with the present invention is as follows:

As mentioned hereinabove, by rotating the adjusting socket or sleeve 72, the upper pivot point 35 of the adjusting lever 31 is displaced in the axial direction thereof over the follow-up piston assembly 22, 23, 24 and 18. As a result thereof, the control piston 29 may be adjusted through the adjusting lever 31 and the slide member 76 in relation to the control bore of the line $A_6$. This effects a displacement of the point M effectively constituting a reversal point in the diagram of FIGURE 2, and more particularly during adjustment of the point 35 in the direction of arrow Z toward the point M' and in the direction of arrow W toward the point M". Simultaneously therewith, this adjustment also effects a parallel displacement of the line $r$.

By rotating the screw 90 the guide piece 89 is displaced in either the direction of arrows 100 or 101. With a movement in the direction of arrow 100, the wedge member 92 of the adjusting member $e_3$ slides along the guide portion 87 in the downward direction so that the control piston 33 is displaced in the direction of arrow 102 by the return spring 34. If, on the other hand, the guide piece 89 is displaced in the direction of arrow 101, then the control piston 33 is displaced in the direction of arrow 103. This entails a displacement of the point P also constituting a reversal point toward P' in the diagram of FIGURE 3. A displacement of the control piston 33 in the direction of the arrow 102 effects a displacement of the point P toward P". This produces simultaneously a parallel displacement of the line $s$.

By adjusting or displacing the adjusting member $e_1$ in the direction of arrows 106 or 107, the effective lever arm of the adjusting lever 31 is changed in relation to the acceleration limit installation B so that a more flat or more inclined characteristic is thereby imparted to line $r$ (FIGURE 2). An adjustment in the direction of arrow 106 thereby produces a flatter curve of line $r$ whereas an adjustment in the direction of arrow 107 produces a more steep slope of the line $r$.

If the adjusting member $e_2$ is adjusted in the direction of arrows 108 or 109, then the effective lever arm of the adjusting lever 31 is changed in relation to the deceleration limit installation V which influences the configuration of the line $s$ in such a manner that upon adjustment in the direction of arrow 108 the curve or line $s$ becomes more flat whereas with an adjustment in the direction of arrow 109, a steeper slope is imparted to the line $s$.

The various operating steps will now be described hereinafter in detail which occur during acceleration and deceleration of the drive unit.

A stationary condition of the drive unit is assumed at the starting point. Both control pistons 29 and 33 of the acceleration and deceleration limit installations B and V thereby release or open up the oil circulatory control system A which is closed off in this operating condition by a control device operatively connected ahead in the circulatory control system (not illustrated herein). Such control device which may be of any suitable construction may be of the type shown and disclosed in the aforementioned copending applications.

As viewed in the diagram of FIGURE 2, this operating condition corresponds to the point L indicated therein. The compressor end pressure $p_2$ is plotted along the abscissa of this curve whereas the fuel quantity E in liters per hour are indicated along the ordinate thereof. The line $r$ of this figure indicates the upper limit, i.e., the pump limit of the compressor, of the operating range plotted against the pressure $p_2$. The line $s$ represents thereby the lowermost limit of the fuel quantity below which the drive unit would stall or a flame-out would occur in the combustion chamber. The curve $t$ represents the operating characteristic for all stationary operating points of the drive unit which corresponds to a predetermined flight condition.

At first, the details of operations will be described which occur during acceleration of the drive unit G.

During this operating condition, the oil circulatory control circuit is open and pressure oil reaches the chamber 37 over the control lines $A_3$, $A_5$, $A_6$ and $A_7$. The working piston 38 is thereby displaced toward the left as viewed in FIGURE 1 and takes along the fuel metering piston 40 so that the fuel metering slot 46 is further opened and more fuel reaches the injection nozzles through the line 43. The fuel control piston 40 moves toward the left for such length of time until the adjusting lever 31 which pivots in the direction of arrow U assumes such a position that the control piston 29 of the acceleration limit installation B closes the line $A_6$. This corresponds to the point M or to the points M' or M" constituting the reversal points in the diagram of FIGURE 2.

In the meantime, by reason of the increase of the injected fuel quantity, the rotational speed of the drive unit has increased which means simultaneously an increase in the compressor end pressure $p_2$. This in turn entails a shortening or compressing of the pressure cells 26 and therewith an adjustment of the control slide member 22 of the servo-motor S toward the right as viewed in FIGURE 1. The control piston 24 thereby releases the bore 50 so that pressure oil may flow into the space 51 and is thereby able to actuate the servo-piston 18, seeking to displace the same toward the right as viewed in FIGURE 1. At the same time, the pressure oil present in space 52 is displaced and flows off through the return line 21. The operation described hereinabove continues to take place for such length of time, in a manner known per se in connection with a follow-up piston assembly, as the pressure $p_2$ changes or increases. The control piston 29 of the acceleration limit installation B, actuated by the adjusting lever 31 which pivots toward the right in the direction of arrow W by the movement of the pivot point 35 on the extension 18', is thereby displaced toward the right. The control piston 29 releases partly the control bore of the line $A_6$ so that control oil under pressure can flow into the chamber 37 and can actuate the working piston 38.

The operation described last takes place by reason of the geometric dimensioning and ratios and interrelationships of the individual members and parts of the control installation and adjusting mechanism with respect to each other in the sense that a fuel increase is obtained in dependence on the compressor end pressure $p_2$ along the line $r$ (FIGURE 2) until the point N is reached. Upon reaching the predetermined rotational speed, the fuel quantity is reduced from N to O by a fuel quantity which is in excess of the acceleration of the drive unit.

If the output of the drive unit is to be decreased, then the control line $A_3$ is placed in communication with the return line (not illustrated) in any suitable manner not illustrated herein. The working piston 38 of the fuel metering installation C is thereby displaced toward the right by the force of the spring 39 and the oil present in chamber 37 is displaced thereby. Simultaneously therewith, the fuel metering piston 40 is taken along so that the fuel quantities supplied to the injection nozzles is decreased. The extension 41 thereby takes along the adjusting lever 31 in the direction of arrow R which adjusting lever 31 abuts against the rod 32' of the control slide member 32 and thereby also displaces the control piston 33 of the deceleration limit installation V toward the right which finally closes off the control line $A_7$ by the control piston 33. As viewed in the diagram of FIGURE 3, the operating conditions attained thereby correspond to the point P constituting a reversal point along the lower limit line $s$. In the meantime, the compressor end pressure $p_2$ is decreased by reason of the reduction in the rotational speed of the drive unit. This entails an expansion of the pressure cells 26 and therewith a displacement of the pivot point 35 toward the left as viewed in FIGURE 1 of the drawing. The adjusting lever 31 thereby swings in the direction of arrow Z whereby the control slide member 32 of the deceleration limit installation V is able to move toward the left so that the line $A_7$ is again partly opened. The force of the spring 39 is thereby again able to become effective. Additionally, oil is displaced out of the chamber 37, while the fuel metering piston 40 moves toward the right and thereby reduces the metering slot 46. The operation described last takes place for such length of time until the point Q of the diagram in FIGURE 3 is reached. This point Q corresponds to the preselected lower rotational speed. The stationary operating condition which adjusts itself subsequently then corresponds to the point L in the diagram of FIGURE 3.

While I have shown and described one embodiment in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:

1. An adjusting mechanism, especially for a control system controlling the fuel quantity supplied to a gas turbine drive unit having compressor means, comprising hydraulically actuated fuel metering means for metering the fuel quantity flowing to the drive unit, pressure responsive means operating in depedence upon a compressor magnitude, acceleration limit means and deceleration limit means each including piston means, connecting means operatively connecting the limit means with each other, said connecting means constituting also an abutment as well as actuation means for the piston means of said limit means to effectively adjust said fuel metering means in such a manner that maximum and minimum permissive fuel quantities are not transgressed during operation of said drive unit, a hydraulic control circuit, said limit means being arranged within said hydraulic circuit, adjusting means for independently adjusting the maximum and minimum permissive fuel quantities, a control housing for said adjusting mechanism, said connecting means including an adjusting lever provided with a pivot point at one end thereof, said adjusting means including a first adjusting member displaceably arranged on said adjusting lever and engaging an abutment member connected with the piston means of the acceleration limit means, drag lever means pivotally mounted on said control housing near one end thereof and operatively connected near one end thereof with the outer end of said fuel metering means, said drag lever means being also in force-locking abutment with an abutment member connected to the piston means of said deceleration limit means, said drag lever means including a guide piece having an inclined surface, a second adjusting member provided with wedging means pivotally secured thereto which slides along the inclined surface of said guide piece, a third adjusting member displaceably guided on said adjusting lever and movably arranged on said wedging means, and manually adjustable means for adjusting the pivot point of said adjusting lever in the axial direction thereof.

2. An adjusting mechanism according to claim 1, wherein the abutment pin of the piston means of said acceleration limit means is provided in the form of a hammer head.

3. An adjusting mechanism according to claim 1, wherein said adjusting members are provided with guide means to enable displacement thereof within said control housing, and complementary means adapted to engage with said guide means to enable axial displacement of said adjusting members upon rotation of said complementary means.

4. An adjusting mechanism according to claim 3, wherein said guide means are in the form of threaded sleeve portions, and wherein said complementary means are threaded bolt members adapted to engage within said threaded sleeve portions, said bolt members being rotatably supported within said control housing so as to be non-displaceable in the longitudinal direction thereof.

5. An adjusting mechanism according to claim 1, wherein said first and third adjusting member include a threaded sleeve portion, an arm portion pivotally secured to said threaded sleeve portion, and approximately triangularly shaped slide means rigidly secured to said arm portion, said slide means being constituted by two shackle-type side bars retained by a plurality of bolt members corresponding in length to the width of said adjusting lever, said bolt members including a through bolt roller member in contact with an end portion of said piston means of said acceleration limit means, said through bolt roller member being adapted to engage with said adjusting lever.

6. An adjusting mechanism according to claim 5, wherein said second adjusting member is constituted by a forked lever, a threaded sleeve portion to which said forked lever is pivotally secured, and said wedging means are arranged between the outer ends of the fork parts of said forked lever.

7. An adjusting mechanism according to claim 6, wherein the two fork portions of said forked lever laterally enclose therebetween said drag lever means.

8. An adjusting mechanism according to claim 7, wherein said pressure responsive means include pressure cell means, servo-piston means operatively connected with said pressure cell means, and threaded adjusting means threadedly engaging said control housing for adjusting said pressure cell means and therewith said servo-piston means in the axial direction thereof.

9. An adjusting mechanism, especially for a control system controlling the fuel quantity supplied to a gas turbine drive unit having compressor means, comprising a hydraulic control circuit providing an actuating fluid medium under pressure, hydraulically actuated fuel metering means for metering the fuel quantity flowing to the drive unit, pressure responsive means operating in dependence upon a compressor magnitude, acceleration limit means and deceleration limit means each including piston means, connecting means operatively connecting said limit means with each other, said connecting means constituting also abutment as well as actuation means for the piston means of said limit means to effectively adjust said fuel metering means to prevent transgression of maximum and minimum permissive fuel quantities essentially over the entire operating range of the drive unit, said limit means being arranged within said hydraulic circuit, adjusting means for independently adjusting the maximum and minimum permissive fuel quantities, a control housing for the adjusting mechanism, said adjusting means including three adjusting members, means for pivotally securing said adjusting members in relation to said control housing, and means for effectively adjusting the pivot point of each of said adjusting members in relation to said control housing, said adjusting members being in operative engagement with said metering means, said pressure responsive means, said acceleration limit means, and said deceleration limit means.

10. An adjusting mechanism according to claim 9, further comprising drag lever means operatively connected between said fuel metering means and one of said limit means and in operative engagement also with at least some of said adjusting members and said connecting means.

11. An adjusting mechanism for a control system controlling the fuel quantity supplied to a gas turbine drive unit having control housing means and compressor means, comprising hydraulic control circuit means providing an actuating fluid medium under pressure, hydraulically actuated fuel control means connected with said hydraulic control circuit means and selectively actuated by the fluid medium thereof for adjustably metering the fuel quantity flowing to the gas turbine drive unit, said fuel control means during both acceleration and deceleration being effective to supply fuel in accordance with respective predetermined correlations to a pressure magnitude of the compressor means, acceleration limit means and deceleration limit means each including piston means connected within said hydraulic control circuit means for influencing actuation of said fuel control means by said fluid medium during acceleration and deceleration to maintain predetermined maximum and minimum fuel quantities supplied to said gas turbine drive unit essentially over the entire operating range thereof, and adjustment means cooperating with said limit means and therewith with said fuel control means to enable independent regulation during operation of the drive unit of each of the predetermined correlations for supplying fuel to the drive unit and the maximum and minimum permissive fuel quantities supplied to the drive unit, during acceleration and deceleration, said adjustment means including an individual adjustable device for each of the two predetermined correlations and the maximum and minimum permissive fuel quantities, each adjustable device being positioned for access during operation of the drive unit from outside the control housing means and being connected to a respective one of said piston means of said limit means to influence the position of the respective piston means within said hydraulic control circuit means.

12. An adjusting mechanism for a control system controlling the fuel quantity supplied to a gas turbine drive unit having compressor means, comprising hydraulic control circuit means providing an actuating fluid medium under pressure, hydraulically actuated fuel control means connected with said hydraulic control circuit means and selectively actuated by the fluid medium thereof for adjustably metering the fuel quantity flowing to the gas turbine drive unit, said fuel control means during both acceleration and deceleration being effective to supply fuel in accordance with respective predetermined correlations to a pressure magnitude of the compressor means, acceleration and deceleration limit means each including piston means connected within said hydraulic control circuit means for influencing actuation of said fuel control means by said fluid medium to maintain predetermined maximum and minimum fuel quantities supplied to said gas turbine drive unit essentially over the entire operating range thereof, and adjustment means cooperating with said limit means and therewith with said fuel control means to enable independent regulation of each of the predetermined correlations for supplying fuel to the drive unit and the maximum and minimum permissive fuel quantities supplied to the drive unit, said adjustment means including an adjusting lever having a pivot point adjacent one end thereof and connected to both limit means forming an effective lever arm with respect to each limit means, means to displace the pivot point of said adjusting lever to adjust the predetermined maximum fuel quantity, means to vary the effective lever arm of said adjusting lever with respect to said acceleration limit means to adjust the respective predetermined fuel supply correlation, means to vary the effective lever arm of said adjusting lever with respect to said deceleration limit means to adjust the respective predetermined fuel supply correlation, and means to adjust the position of the piston means of said deceleration limit means to adjust the predetermined minimum fuel quantity.

References Cited in the file of this patent

UNITED STATES PATENTS

| | | |
|---|---|---|
| 2,779,422 | Dolza | Jan. 29, 1952 |
| 3,064,421 | Jurisch | Nov. 20, 1962 |

FOREIGN PATENTS

| | | |
|---|---|---|
| 784,690 | Great Britain | Oct. 16, 1957 |